I. C. WOODWARD.
SELF LOCKING SCREW THREAD.
APPLICATION FILED DEC. 21, 1916.

1,250,748. Patented Dec. 18, 1917.

WITNESS
George C. Schultz

INVENTOR.
Irving C. Woodward,
BY
Rummler & Rummler
ATTORNEYS.

UNITED STATES PATENT OFFICE.

IRVING C. WOODWARD, OF CHICAGO, ILLINOIS.

SELF-LOCKING SCREW-THREAD.

1,250,748.  Specification of Letters Patent.  Patented Dec. 18, 1917.

Application filed December 21, 1916. Serial No. 138,168.

*To all whom it may concern:*

Be it known that I, IRVING C. WOODWARD, a citizen of the United States of America, and a resident of Chicago, county of Cook, and State of Illinois, have invented certain new and useful Improvements in Self-Locking Screw-Threads, of which the following is a specification.

The main objects of this invention are to provide an improved form of thread for nuts, bolts, etc., which is self-locking and secures the nut in any position on the bolt, regardless of pressure between the nut and the part which is to be retained in place on the bolt; to provide an improved thread for a nut which will retain the nut in its set position irrespective of oscillation or rotation of the member which is retained on the bolt; and to provide locking threads which are uniform in cross sectional area, of uniform pitch, and which may be cut by the same operations which are employed to cut well known standard forms of thread.

An illustrative embodiment of this invention is shown in the accompanying drawings, in which—

A number of different designs of self-locking threads have heretofore been provided, but as a general rule, such prior forms of threads known to applicant were usually a considerable departure in strength and design from the well known standard non-locking V threads, but when such standard forms of threads were made self-locking, it was common to effect the latter purpose by changing the pitch of the thread at different points on the nut or bolt or to distort the thread into a wave form, or to split the thread, or, rather, make a double thread which could be forced between the convolutions of a true V thread. It is the purpose of the present invention to overcome certain objections to said prior forms of self-locking threads, such as weakening by cutting away too much metal or greatly distorting the same, and the further objection in the difficult operations which are required to cut some such abnormal threads.

In the present design of thread, the interfitting or coacting threads on the nut or bolt are of exactly equal cross sectional area as standard threads, and are formed to provide a snug fit along their entire surface in the same manner as do the standard forms of threads now commonly in use. The sole difference between the present invention and well known standard threads is that one member of a pair having coacting threads is provided with a thread the apex of which is slightly to one side of the center or offset so that when the nut is applied to the bolt, such offset portion will be forced back to form a true V or resiliently engage the coacting thread and retain the nut in locked position.

Figure 3:
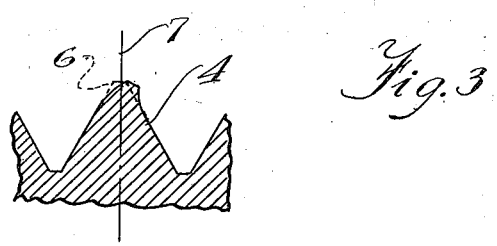
Fig. 3 is an enlarged cross sectional view of the improved thread.

In the drawings, a bolt 1 is provided with the well known form of V thread 2, while the nut 3 is provided with a thread 4 so cut as to be exactly equal in cross sectional area to the thread 2 on bolt 1, but with the apices 5 of the thread slightly offset from a perpendicular passing through the center of the base of the thread. Fig. 3 shows in full lines the shape of thread 4 and in broken lines 6 the position to which the apex of the thread is forced when the nut is secured on to the bolt. 7 represents a line extending perpendicularly from the center of the base of the thread, and this line passes through the center of apex 6 in the dotted position thereof and clearly indicates that normally the apex of the thread is slightly to one side of such center line. The threads 2 and 4 are uniform in pitch, height and width at the base, and are also uniform in cross sectional area, thread 4 differing from thread 2 and other forms of threads in that the apex of the thread is but slightly offset normally. Fig. 3 shows a slight exaggeration of such offsetting.

It will be understood that this invention may be applied to threads having sharp, flat or rounded apices and that in all cases the thread is of substantially that form generally approved and generally in use and providing the same bearing area as the standard forms of threads.

Figure 1:
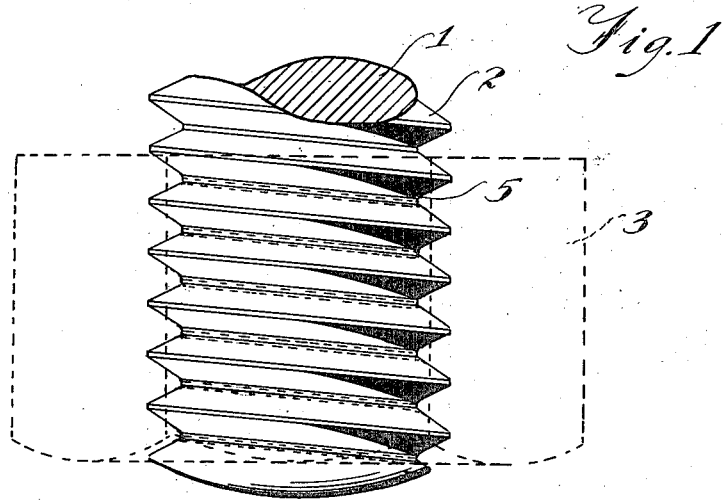
Figure 1 is a sectional view of a bolt and nut, the latter being provided with the improved thread.
Figure 2:
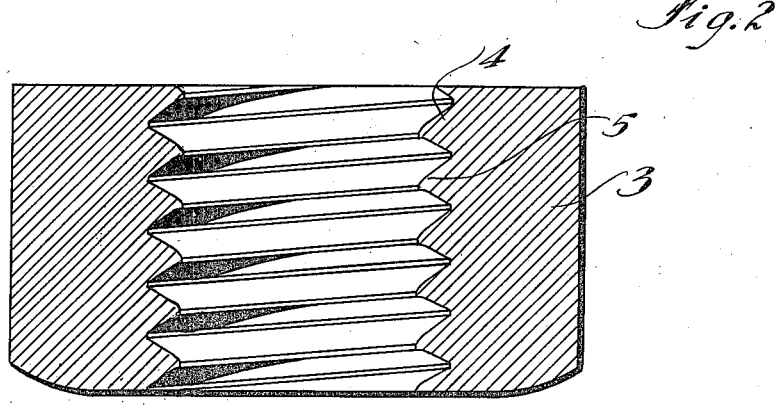
Fig. 2 is a sectional view of the nut.

When the nut is applied to the bolt, the thread 2 on the bolt forces the thread 4 to exactly conform to the shape of thread 2 moving the apex 5 of thread 4 from the position in which it is shown in full lines in Fig. 2 and in dotted lines in Fig. 1 to the position in which it is indicated in section in the latter figure.

Although but one specific embodiment of this invention has been herein shown and described, it will be understood that numerous details of the construction shown may be altered or omitted without departing from the spirit of this invention as defined by the following claims.

I claim:—

1. A device of the class described, comprising two members provided with coacting threaded portions, one member having a V-shaped thread of uniform pitch, the apex of said thread being slightly but uniformly to one side of a perpendicular passing through the center of the base of the thread, the other member having a V-shaped thread of equal cross sectional area but the apex of which is on a perpendicular passing through the center of the base of the thread.

2. A device of the class described, comprising two members provided with coacting threaded portions, one member having a thread of uniform pitch, the apex of which is uniformly offset from a perpendicular passing through the center of the base of the thread, the other member having a thread the apex of which is on a perpendicular passing through the center of the base of the thread.

3. A device of the class described, comprising two members provided with coacting threaded portions, said members having threads of uniform and equal pitch and of equal cross sectional areas, and said threads having different sectional contours.

4. A device of the class described, comprising two members provided with coacting threads of uniform pitch and equal cross sectional areas, said threads having apices differently located with respect to their respective bases.

5. A threaded member, the thread of which has sides extending at an angle of sixty degrees from the base of the thread to approximately three-fourths its height, the remainder or apex of the thread being uniformly formed at different angles.

6. A threaded member, the thread of which has sides extending at equal angles from the base of the thread to approximately three-fourths its height, the remainder or apex of the thread being uniformly formed at different angles.

7. A pair of complementary threaded members, one having a standard thread of equilateral triangular cross section, and the other having a thread of equal cross sectional area and of like triangular form, except that a limited part of its apex portion is uniformly distorted toward one side of a perpendicular passing through the center of its base.

Signed at Chicago this 18th day of December, 1916.

IRVING C. WOODWARD.